(12) United States Patent
Ramalho Geraldes et al.

(10) Patent No.: US 11,747,612 B2
(45) Date of Patent: Sep. 5, 2023

(54) INSTRUMENT FOR MOVING AND POSITIONING OF OPTICAL ELEMENTS WITH NANOMETRIC MECHANICAL STABILING AND RESOLUTION IN SYNCHROTRON LIGHT SOURCE BEAMLINES

(71) Applicant: CENTRO NACIONAL DE PESQUISA EM ENERGIA E MATERIAIS, Campinas (BR)

(72) Inventors: Renan Ramalho Geraldes, Campinas (BR); Ricardo Malagodi Caliari, Campinas (BR); Marlon Saveri Silva, Campinas (BR)

(73) Assignee: Centro Nacional De Pesquisa Em Energia E Materials, Campinas (BR)

( * ) Notice: Subject to any disclaimer, the term of this patent is extended or adjusted under 35 U.S.C. 154(b) by 22 days.

(21) Appl. No.: 17/512,458

(22) Filed: Oct. 27, 2021

(65) Prior Publication Data
US 2022/0075179 A1 Mar. 10, 2022

Related U.S. Application Data

(63) Continuation of application No. 16/331,925, filed as application No. PCT/BR2017/050262 on Sep. 6, 2017, now abandoned.

(30) Foreign Application Priority Data

Sep. 9, 2016 (BR) .......................... 102016020900-5
Sep. 6, 2017 (BR) .......................... 102017019178-8

(51) Int. Cl.
*G02B 26/00* (2006.01)
*G02B 26/10* (2006.01)
(Continued)

(52) U.S. Cl.
CPC ........... *G02B 26/101* (2013.01); *G02B 7/005* (2013.01); *G21K 1/06* (2013.01); *G02B 7/18* (2013.01); *H02K 41/0354* (2013.01)

(58) Field of Classification Search
CPC ........ G02B 26/101; G02B 7/005; G02B 7/18; G02B 26/08; G02B 26/085; G21K 1/06;
(Continued)

(56) References Cited

U.S. PATENT DOCUMENTS 5,283,682 A * 2/1994 Ostaszewski ........ G02B 7/1821
310/22
2003/0197914 A1* 10/2003 Cox ......................... G03F 7/709
355/53

* cited by examiner

*Primary Examiner* — James C. Jones
*Assistant Examiner* — Henry Duong
(74) *Attorney, Agent, or Firm* — Adams and Reese LLP; Ray R. Ferrera

(57) ABSTRACT

An instrument for moving and positioning of an optical element in beamlines comprises a mounting structure to which one (or more) optical element(s) is mounted, as well as a reference structure, in relation to which the mounting structure is moved by means of a moving means of low (or close to zero) mechanical stiffness and in relation to which the position of the mounting structure is metered by means of a high-resolution interferometer. The invention proposes that the instrument also comprises a balance mass for receiving the reaction force from the moving means of the mounting structure, and both the mounting structure and the balance mass are attached to the reference structure by spring means, with specific stiffness properties, allowing the positioning control of the mounting structure to be done by a control system with main feedback loop with high bandwidth (>100 Hz). In order to allow for a broader range of movement between the mounting structure and the reference structure, by means of a cascaded movement, the instrument may further comprise an intermediate structure attached to
(Continued)

the reference structure, also preferably by spring means with specific stiffness properties, the complementary structure receiving the mounting structure and the balance mass in place of the reference structure. Such an instrument may be embodied in a new-generation synchrotron light source beamline mounted double-crystal monochromator, being sufficient for this that the spring means to be conveniently chosen, the reference structure to have a main rotation in relation to the incident beam, and in addition to the crystal mounted to the mounting structure, a complementary crystal to be mounted to the complementary mounting structure rigidly attached to the reference structure.

11 Claims, 3 Drawing Sheets

(51) Int. Cl.
*G21K 1/06* (2006.01)
*G02B 7/00* (2021.01)
*G02B 7/18* (2021.01)
*H02K 41/035* (2006.01)

(58) Field of Classification Search
CPC ....... G21K 2201/062; G21K 2201/067; H02K 41/0354
USPC ..................................................... 359/200.7
See application file for complete search history.

US 11,747,612 B2

INSTRUMENT FOR MOVING AND POSITIONING OF OPTICAL ELEMENTS WITH NANOMETRIC MECHANICAL STABILING AND RESOLUTION IN SYNCHROTRON LIGHT SOURCE BEAMLINES

TECHNICAL FIELD OF THE INVENTION

The invention is related to a novel instrument for moving and positioning of optical elements with nanometric mechanical stability and resolution in synchrotron beamlines comprised of:
- a reference structure;
- a mounting structure, in which one (or more) optical element(s) is mounted, and is movable in relation to the reference structure;
- measure means of the mounting structure in relation to the reference structure;
- a moving means of low (or zero) mechanical stiffness, for movement of the mounting structure related to the reference structure;
- a reaction mass, that is movable in relation to the reference structure, and undergoes the reaction force from the moving means of the mounting structure; and
- a control system with main feedback loop with high bandwidth (>100 Hz).

An optical element of a synchrotron beamline which may be a mirror, a diffraction crystal, a diffraction grating, a compound refractive lens (CRL), a Fresnell Zone Plate (FZP), etc.

BACKGROUND OF THE INVENTION

Such instruments individually are known, and among them, the monochromators may be highlighted. A monochromator is an optical instrument that selects a narrow band of wavelengths (or energy) of light, or other radiation, from a broader range of wavelengths in the input of the instrument entry. It is important to note that it is generally possible to vary this band selection by means of distinct alignments of movements of the monochromator element, and accordingly, the delivery of the wavelength of interest by the instrument. An instrument capable of delivering monochromatic (or quasi-monochromatic, considering the existence of a band) light has many uses in scientific studies and in optics, since the materials properties may depend on or be investigated through their different interactions with different wavelengths. Although there are many ways to select a narrow band of wavelengths (that would be perceived on the visible range as a pure color), these forms are limited due to the range of radiation energy.

Generally, monochromators may resort to both the dispersion phenomenon, as in a prism, and the diffraction phenomenon, from a diffraction grating or a material with crystalline structure, to spatially separate the wavelengths or to ensure specific conditions of constructive interference for the radiation. In the case of the prisms and diffraction gratings, due to the characteristic of spatial scattering, output slots are typically integral parts of the monochromator. Concerning crystalline structures, they are typically used in the configurations of Bragg or Laue, which can also utilize posterior slots to limit the beamline or block spurious scatterings.

Studies with X-rays allow for the investigation of properties of the matter that may not be accessible by other means. Methods using absorption, transmission, fluorescence, scattering, and diffraction provide information of matter composition and structure, in addition to allow for images and tomographies to be obtained. These methods are frequently non-destructive, and constitute a powerful and important set of tools for research, complementing other methods, such as chemical analysis and conventional microscopy.

The laboratories of synchrotron light, hereinafter only referred to as synchrotrons, are research facilities where broad range and high brightness electromagnetic radiation is generated from a storage ring. In this storage ring, high-energy electrons in relativistic conditions are capable of controllably emitting photons, the so-called synchrotron radiation, from interactions with powerful magnetic fields of bending magnets or insertion devices (undulators and wigglers). A similar technology is utilized in the so-called free electron lasers (FELs).

Some of the research fields on synchrotrons include condensed matter physics, materials science, chemistry, biology, and medicine. As such, the experiments might cover applications that explore from sub-nanometric regions, within a cell, for instance, to samples of many centimeters in size, as in analysis of medical or veterinarian images. Thus, in addition to research aims, synchrotrons are also used for industrial applications, such as the micro-fabrication of devices.

From 2016 on, new generation synchrotron light sources started their operations. These new generation synchrotrons are characterized for very high brightness, or more specifically, for an ultra-low emittance, wherein the light source diffraction limit may be achieved by photons below a determined energy level. Therefore, this very low emittance is related to a very small light source (in the order of few micrometers for X-rays, for example), and with very low divergence. For this new characteristic to be possible and useful, extreme levels of stability are required for both the accelerator and the experimental stations, the so-called beamlines.

Double-crystal monochromators (DCMs) are a kind of instrument commonly utilized in X-rays beamlines for energies from few keV. The principle underlying these instruments is that a given condition of Bragg's diffraction may be obtained in two subsequent crystals, in order to select a narrow band of energy from the input (incident) beam, that has a broad range of energy, and to allow for the monochromatic beam leaving the instrument to be held in a constant position, regardless the variation of the Bragg's angle for different energies. The schematic diagram is shown in the FIG. 1.

In fact, the Bragg's diffraction is a geometric phenomenon, since the condition of constructive interference for the selected radiation is dependent of the angle (named, for this reason, to as Bragg's angle) between the incident beam and the crystalline planes of the crystal. Accordingly, the determination of the energy for an experiment is related to the choice of the Bragg's angle on the monochromator, that is, the rotation of the crystals in relation to the incident beam. Thus, it is clear that one of the advantages of the DCMs in relation to other types of X-ray monochromators is to allow the separation (offset) between the incident and monochromatic beams to be kept constant, through the variation of the separation (gap) distance between the crystals as a function of the Bragg's angle. FIG. 2 depicts an example of a DCM wherein the photon beams are propagated over the z-axis, and the rotation axis (rotation of the Bragg's angle) is in the x direction and coincides with both the face of the first crystal and the position of the incident beam. By representing the crystals in two different angles, it is clear that to keep the monochromatic beam in the same position (constant offset in relation to the incident beam) the distance between the crystals (gap) should be varied as a function of the Bragg's angle.

For the Bragg's condition to be met in both crystals, it is necessary to ensure a suitable alignment, which can be seen as the perfect parallelism between the two crystals. For this reason, in addition to a free degree of freedom for the rotation to adjust the Bragg's angle, and a free degree of freedom for the relative translation between the crystals for the gap variation, the DCMs typically rely on two degrees of freedom for relative rotation between the crystals, referred to as pitch and roll (terms from aviation), perpendicular to the direction of translation. Therefore, a basic DCM has, in addition to the main free degree of freedom for the Bragg's angle, three relative free degrees of freedom between the crystals: gap, pitch and roll, which may be combined in a single crystal or distributed according to any desired combination.

The mechanisms responsible for these degrees of freedom should present not only sufficiently fine moving resolution, but also suitable mechanical stability, to avoid undesirable dynamic effects, which may cause errors on the energy selection, reduction of the photon flow and/or shifts in the direction of propagation of the monochromatic beam in relation to the incident beam. Considering all mentioned degrees of freedom, the adjustments of pitch and roll have to meet the strictest requirements in terms of resolution and stability. Therefore, the mechanisms of these degrees of freedom typically utilize high-resolution mechanical actuators, such as piezoelectric actuators and micro motors. Once integrated to feedback signals, these mechanisms may compensate misalignments resulting from limitations of mounting, heat and/or gravitational effects, and parasitic movements on the gap mechanism. FIG. 3 illustrates these three adjustment movements (y', Rx' and Rz') of the second crystal in relation to the first, highlighting the possible use of local or outer feedback signals, from position or beam sensors, respectively.

The existing construction technologies of DCMs are limited in terms of stability of the relative parallelism between the crystals, that is, in the pitch and roll. Specially in the DCMs with vertical offset between the input and output beams, that is, those DCMs in which the rotation axis of the Bragg's angle is horizontal, the best equipment have difficulties in dealing with angular variations higher than 100 nrad RMS (analyzed in a frequency band up to 2.5 kHz). Few vertical DCMs have already demonstrated a performance of approximately 50 nrad RMS under special conditions, that is, with the moving mechanisms being completely stopped. It is important to emphasize that DCMs of horizontal offset, that is, with vertical rotation axis, are less impacted by gravitational effects, and can present slightly better results, typically by a factor of 2. In both cases, however, if the stability of parallelism is evaluated while the mechanisms of the Bragg's angle and the gap are operating, which is necessary for experiments with continuous energy scan (the so-called flyscans), for example, the vibration levels are easily widened by over 10 times, easily exceeding 1 μrad RMS.

Due to the exceptional characteristics of the new generation synchrotron light sources, the future beamlines will require levels of stability lower than 10 nrad RMS, including during flyscans. It means that instruments with performance of 5 and 100 times better than the current state-of-the-art are needed. The results mentioned for operating instruments are the outcomes of efforts made by manufacturers and users over last years to make improvements to the existing technologies. As such, the evolution achieved in stability was very limited, representing a relative stagnation of the current technology, with practically no real perspective that new demands of new generation synchrotrons could be met.

In fact, the existing technology is based on mechanical projects focusing on upmost stiffness, while, contradictorily, the relative degrees of freedom are typically obtained from the stacking of individual movement mechanisms for gap, pitch and roll. This approach is limited by the finite stiffness of the middle parts and of the mechanical connections, which quickly deteriorates the mounting effective stiffness. In addition, the levels of stability required are so low that these adjustment mechanisms need to offer a high capability to reject disturbances (noises). These disturbances are caused by vibrations from the ground, sources of neighboring vibrations such as vacuum pumps, and DCM internal vibration sources, such as cooling systems, motors and actuators, and bearings. To achieve a noise rejection capability that presents a performance at least=reasonable at least, adjustment mechanisms need to work with main loop feedback control with a bandwidth above 100 Hz. The piezoelectric and micro motor actuators currently utilized would hardly be able to achieve control bands above 20 Hz.

DETAILED DESCRIPTION OF THE INVENTION

The object of the present invention is to provide a synchrotron light source beamline instrument that meets the high demands of the new generation of synchrotron light sources. This object is achieved by an instrument according to claim 1. To this end, the instrument proposed in this invention is characterized for:

- at least one reaction movable mass attached to the reference structure in one or more directions, in the same manner as the mounting structure, wherein the moving means of the mounting structure acts in relation to the reaction mass, instead of in relation to the reference structure;
- a positioning means which measures the position of the mounting structure directly relative to the reference structure for greater accuracy,
- a main loop feedback control including the positioning means and the moving means, wherein the means of position measurement information is used to control the position of the mounting structure relative to the base by means of the moving means.

The active feedback can be improved (broader control band, typically above 100 Hz) with the disclosure of this instrument due to the use of the reaction mass and a suitable dynamic architecture. The reaction mass acts as a low-pass filter in the path of the reaction forces, such that only the direct path dynamics of the forces in the mounting structure limits the possible bandwidth. In addition, the suitable dynamics depends on low (or close to zero) stiffness between the mounting structure and reaction mass, therefore, the position actuators should be a low-stiffness actuator (inherently complacent actuator). Thus, in the device according to the invention, critical degrees of freedom are controlled by means of feedback loop of the sufficiently high main loop bandwidth, allowing for high disturbance rejection and high reference tracking capability.

A further embodiment of the instrument according to the invention is characterized for comprising a complementary structure attached in a movable manner to the reference structure, and a complementary moving means of this complementary structure in relation to the reference structure, both the mounting structure and the reaction mass being attached in a movable manner to this complementary structure, rather than to the reference structure. Preferably, the maximum offset of the complementary structure in relation to the reference structure is greater than the maximum offsets of the mounting structure and the reaction mass in relation to the complementary structure, thus allowing for, due to that combination of levels, broader range of movement of the mounting structure in relation to the reference structure. Preferably, the mounting structure is attached to the complementary structure by a first spring means, the reaction mass, in turn, is attached to the complementary structure by a second spring means, and the complementary structure, is attached to the main structure by means of a third spring means. These spring means are still preferably a leaf spring, or a combination of leaf springs, to give movement capabilities of interest with suitable dynamics.

An embodiment of the instrument according to the invention is characterized for having the main rotative structure around an axis perpendicular to the incident beam, and having the complementary structure movable in relation to the reference structure in only one translation, in the plane of the photon beams and perpendicular to the rotation axis of the main structure, such that the third set of leaf springs is little rigid in the direction of offset, but rigid in the other directions perpendicular to the direction of offset, as well as rigid to rotations. The mounting structure is preferably movable in relation to the complementary structure in only one translation, in parallel with the moving direction of the complementary structure in relation to the reference structure, but also in two rotations, around the axes perpendicular to the axis de translation, such that the second set of leaf springs is little rigid in the direction of translation, and in the two perpendicular rotations, but rigid in the two directions perpendicular to the direction of offset, as well as rigid in the rotation around this. Likewise, the reaction mass is preferably movable in relation to the complementary structure in only one translation, in parallel with the moving direction of the complementary structure in relation to the reference structure, but also in the two rotations, around the axes perpendicular to the axis of translation, such that the third set of leaf springs is little rigid in the direction of translation, and in the two perpendicular rotations, but rigid in the two directions perpendicular to the direction of offset, as well as rigid in the rotation around this. Still, the moving means between the mounting structure and reaction mass is preferably performed by three Lorentz type actuators (voice-coils), capable of acting on three low-stiffness degrees of freedom of the mounting structure and of the reaction mass.

Moreover, an embodiment of the instrument, according to the invention, is characterized for having the complementary mounting structure rigidly attached to the reference structure, and to which is mounted a complementary optical element. Preferably, the measurement means comprises three (or more) position sensors, such as means of position measurement, metering in the three degrees of freedom of interest the position of the mounting structure directly related to the complementary mounting structure, so as to increase the measure accuracy between the optical elements.

The instrument according to the invention and the above detailed description is especially advantageous in the embodiment of a double-crystal monochromator (DCM), wherein the optical elements are crystals, fixed to the mounting structure and to the complementary mounting structure. Moreover, it is desirable to utilize more than one pair of crystals, with different crystalline orientations in the same instrument. Thus, it is perfectly possible that more than one crystal is rigidly mounted on the mounting structure, whereas their complementary pairs are rigidly mounted on the complementary mounting structure. The embodiment of the instrument according to the invention as a DCM with control of main feedback loop with high bandwidth is capable of satisfying the demands of stability of new generation of synchrotron light source mounted DCMs (as described in the section Backgrounds).

BRIEF DESCRIPTION OF THE DRAWINGS

The invention will be clarified in more details based on diagrammatic drawings as follows.

DETAILED DESCRIPTION OF THE DRAWINGS

Figure 1:
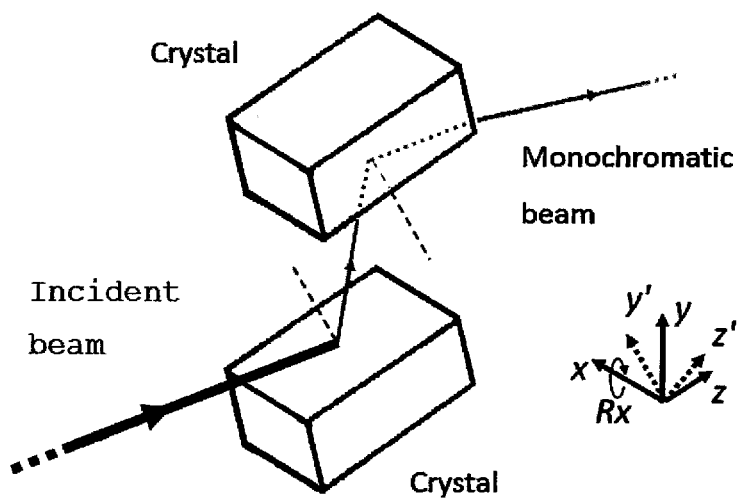
FIG. 1 illustrates the situation in which given condition of Bragg diffraction occurs in two subsequent crystals, filtering an incident beam of wide range, and delivering a monochromatic beam.

FIG. 1 illustrates the situation in which given condition of Bragg diffraction occurs in two subsequent crystals, filtering an incident beam of wide range, and delivering a monochromatic beam. It is also indicated a base coordinate system (xyz) and the coordinate system rotated (xy'z') around Bragg's angle (Rx), shown in the example on the x-axis.

Figure 2:
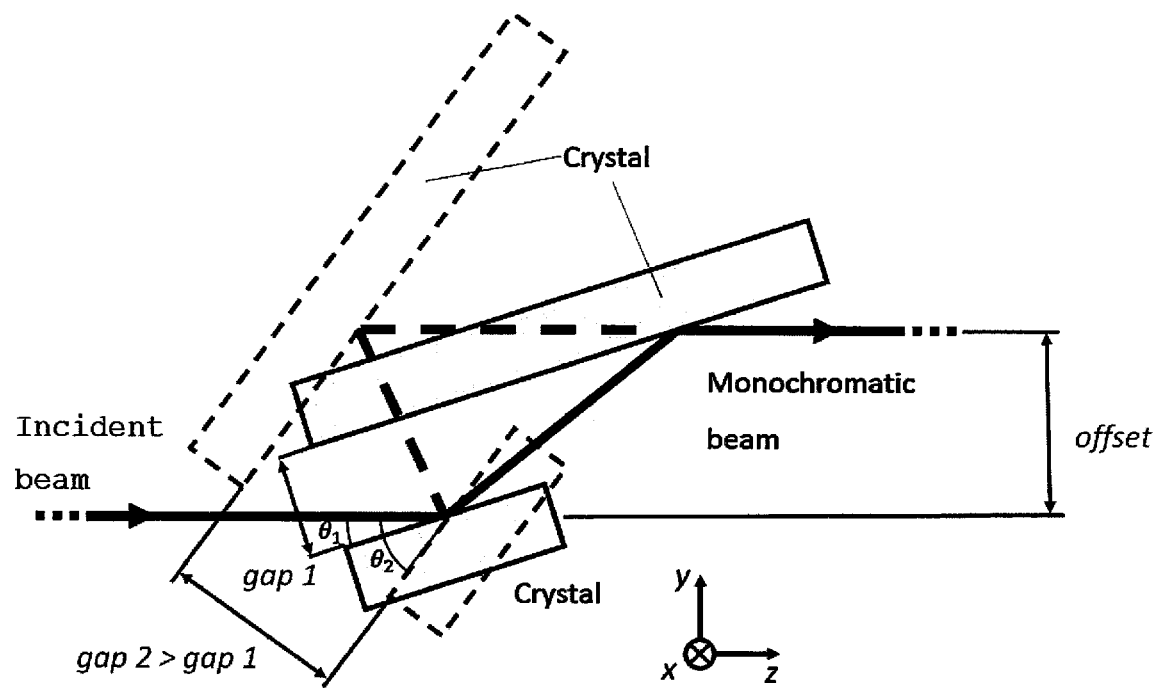
FIG. 2 illustrates the principle of a DCM, in which the separation (gap) between the two crystals changes due to the rotation angle (Bragg's angle), to keep the position of the constant monochromatic beam.

FIG. 2 illustrates the principle of a DCM, in which the separation (gap) between the two crystals varies as function of the rotation angle (Bragg's angle), to keep the position of the constant monochromatic beam, in relation to the incident beam with a fixed separation (offset). It is possible to see, for a given Bragg's angle $\theta_1$, less than the other arbitrary Bragg's angle $\theta_2$, the correspondent gap (gap 1) is smaller than the gap (gap 2) corresponding to $\theta_2$.

Figure 3A:
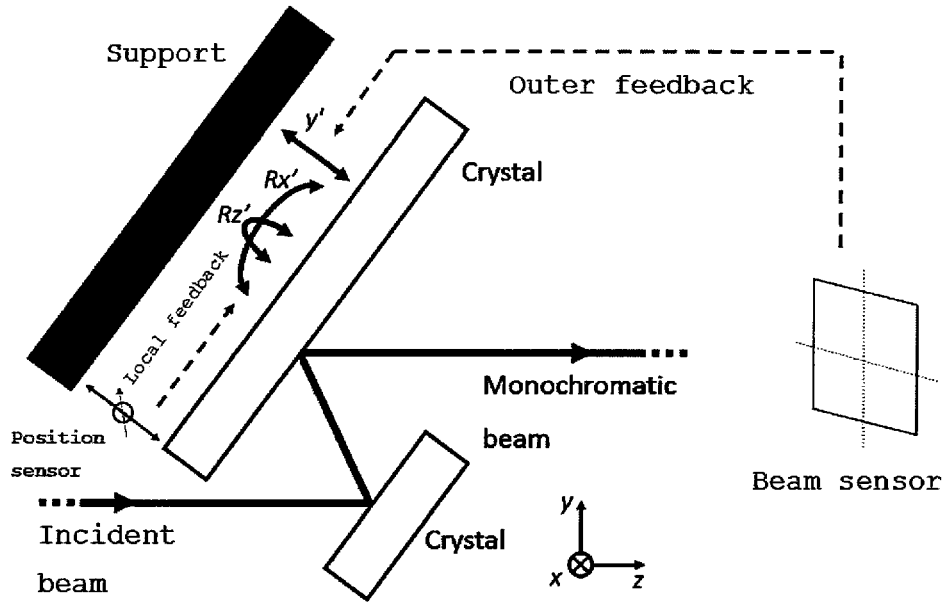
FIGS. 3A and 3B show a scheme with a possible configuration to three basic relative-adjustment movements between two crystals of a DCM and signals of local or outer feedback, from the position or beam sensors, respectively, an important difference in the manner of local feedback being highlighted between FIGS. 3A and 3B.
Figure 3B:
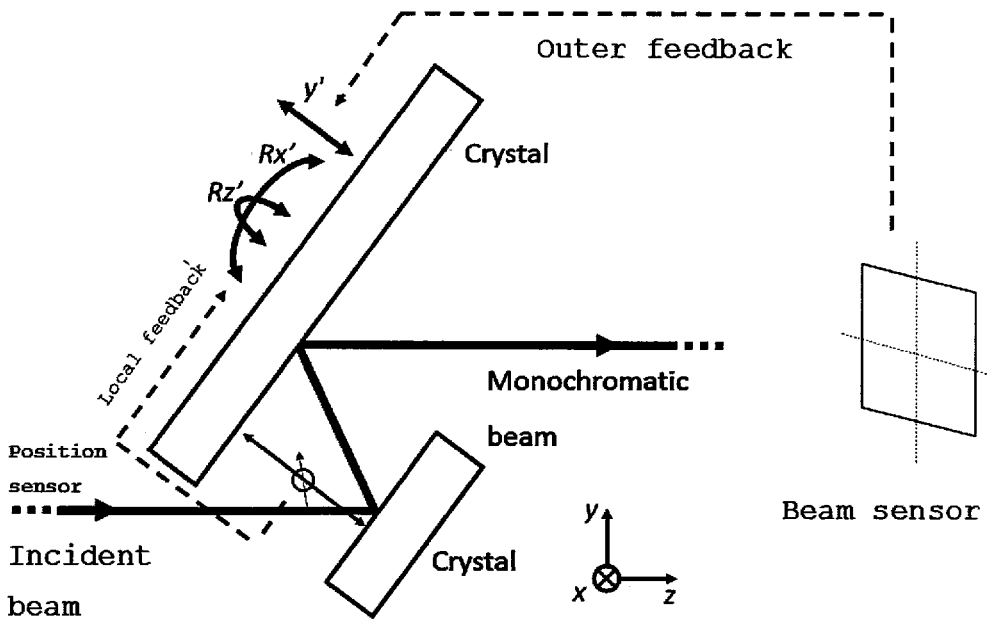

FIGS. 3A and 3B show two crystals of a DCM in a given Bragg's angle, with the essential relative adjustments between the first and second crystals, namely: gap (y'), pitch (Rx'), and roll (Rz') (in which the indication ' concerns the rotational coordinate system, according to Bragg's angle). FIG. 3A shows signals of feedback typically utilized, namely: local feedback, typically performed with the moving mechanism of the crystal and metering the position of the crystal in relation to its support; and external feedback, utilizing the signal of a beam sensor downstream the DCM for actuation on the adjustment mechanisms of the crystal. There are instruments that are based only on one of the types of feedback, as well as instruments that utilize both in a complementary manner. FIG. 3B also presents both local and outer feedback signals, but emphasizes that, according to the present invention, the position metering in the local feedback should be made between the crystals, or between their mounting structures, not in relation to a support of one of the crystals, which brings no direct information related to the position and stability of the complementary crystal. Moreover, according to the invention, for a bandwidth of a sufficiently high main loop control (>100 Hz) to be possible, the speed of the feedback system should also be high, that is, around 10 kHz. As these speeds are not typically available on beam sensors, the positioning sensors related to the reference structure were put as mandatory. However, if the signal of a beam sensor exhibits the needed accuracy and speed characteristics, this signal could replace the local positioning sensors of the instrument.

Figure 4A:
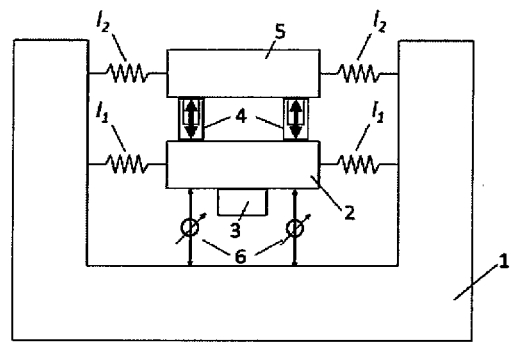
FIGS. 4A, 4B and 4C show possible embodiments of the instrument, according to the present invention.
Figure 4B:
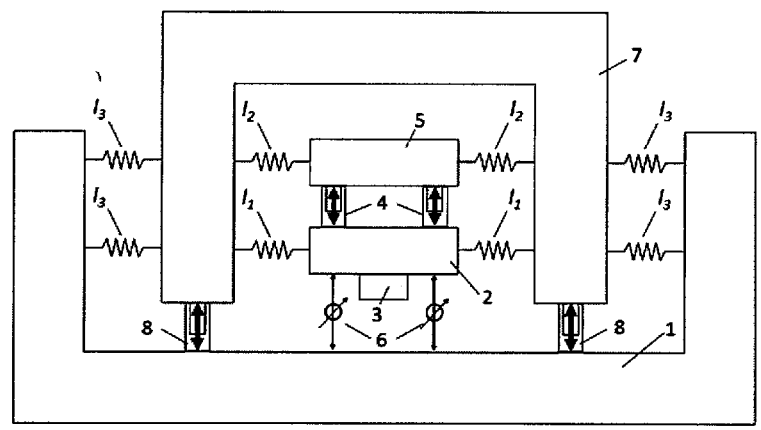
Figure 4C:
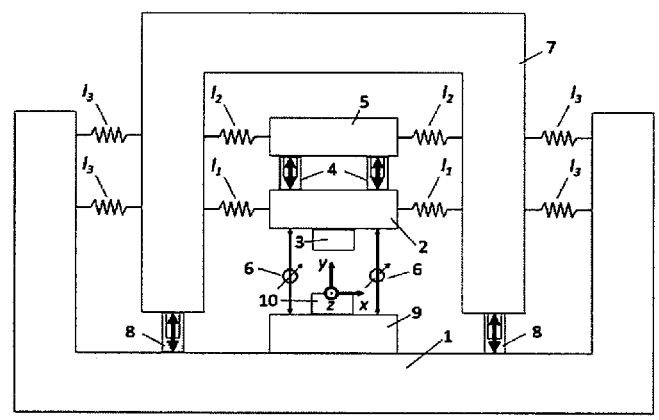

FIGS. 4A, 4B and 4C show possible embodiments of the instrument, according to the present invention. FIG. 4A shows an essential embodiment of a beamline instrument, according to the present invention, in which the optical element (3) is rigidly mounted to the reference structure (2), which position in relation to the reference structure (1) is measured by means of the means of position measurement (6). The movement of the mounting structure (2) occurs through the moving means (4) due to the position measurement of the means of position measurement (6), both integrated to the system of main feedback loop of the instrument. Differently from the traditional instruments, the moving means forces (4) needed to moving the mounting structure (2), react in a reaction mass (5), acting as a dynamic filter and allows for the bandwidth of the feedback system to be only limited by the inner dynamics of the mounting structure (2), and of the optical element (3), and not by the dynamics (resonances) of the other components of the instrument, as it is the case of the already existing instruments. Both mounting structure (2) and reaction mass (5) attachment to the reference structure are preferably made by spring means ($I_1$ and $I_2$), which are able to ensure suitable stiffness properties, that is, to define free and restrict degrees of freedom, according to the movements of interest of the optical element in relation to the photon beam, as well as eliminate non-linearities resulting from mechanical guides with friction. FIG. 4B differs from the FIG. 4A only due to the inclusion of a complementary structure between the reference structure (1) and the assembly formed by the mounting structure (2) and the reaction mass (5), aiming at increasing the amplitude of movement between the mounting structure (2) and the reference structure (1), since the spring means necessarily present limited amplitude of movement. Systems of two (or more) levels are, in fact, common in equipment from several areas demanding great dynamic range, that is, many orders of magnitude between the resolution (and/or accuracy) and the range of a given movement.

FIG. 4C schematically shows the embodiment of the instrument, according to the present invention, constituted as a DCM, for which were added to the reference structure (1): a complementary mounting structure (9), and a complementary optical element (10). According to the coordinate system of the Figure, the photon beam propagates through the z-axis, coplanarly to the rotation axis of the reference structure (1) (x-axis), hitting the first crystal of the DCM, the complementary optical element (10). The first crystal (10) is rigidly fixed to the complementary mounting structure (9), which is rigidly fixed to the main structure (1), that is, there are no relative free degrees of freedom for the adjustment between the crystal (10) and the main structure (1). The complementary structure (7) is attached to the main structure (1) through 5 (or 6) folded leaf springs (13), giving a single relative free degree of freedom of translation between these structures, whose function is to allow for the adjustment of the gap at a first level. The position actuators (8) of the complementary structure (7) may be performed in different manners, as for example via the stepper, servomotor or linear motor, among others. Eventually, both the mounting structure (2) to which the second crystal, the optical element (3), is rigidly fixed, and the reaction mass (5) are attached to the complementary structure (7) by means of a set of 3 folded leaf springs ($I_1$ and $I_2$), giving three relative degrees of freedom between them and the complementary structure (7), namely: gap (second level), pitch and roll. In fact, by adequately projecting the folded leaf springs, they can be combined to embody mechanical guides only with desired free degrees of freedom, by suppressing the movement of the elements in the non-controllable degrees of freedom due to the characteristics of high stiffness. For the actuation over these three free degrees of freedom and the positioning and stabilization of the mounting structure (2) in relation to the complementary mounting structure (9), the moving means (4) is performed as three Lorentz type actuators (voice coils), which have their forces actuating between the mounting structure (2) and reaction mass (5), providing an "inner" dynamics of forces to adjust the accuracy of the gap and to control the parallelism between the crystals, avoiding that these forces are propagated as disturbances for (1), (7), (9), and (10). The feedback is provided by the positioning sensors (6), performed with 3 (or 4) interferometric distance sensors, that can be combined to measure the distance and two angles of interest between the metrological references of the two crystals, that is, the mounting structure (2) and complementary mounting structure (9). The interferometric distance sensors contemplate: the characteristics of great dynamic range, being capable of metering with resolution and nanometric accuracy over tens of millimeters; and high speeds of measurement, allowing for the high stability and high dynamic performance required in the new generation synchrotron light source beamline mounted DCMs. It was chosen by simplicity not to describe in details the manner in which this rotation of the reference structure occurs in relation to the photon beam, but preferably it was decided to use a system of double-bearing (from both sides of the reference structure) and direct drive type motor for rotation of the synchrotron light source beamline mounted DCM, in relation to a base installed into the synchrotron light source beamline. It is important to note, however, that the rotative system of the main structure itself, may be performed according to the present invention, wherein the elements from (2) to (10) of the instrument herein detailed would be grouped as the new "optical element" of the invention, and the main structure of the instrument herein detailed would be equivalent to the mounting structure of this new instrument.

Eventually, it should be emphasized again that, although the invention is exemplified by means of a synchrotron light source beamline mounted DCM in most of the Figures, that it is not limited anyway to the exemplified embodiments in these drawings. The invention may be extended, therefore, to any and all embodiments that are within the scope defined by the claims. Therefore, the instrument of the present invention can be an instrument to position mirrors, FZPs, CRLs, steps of manipulation of samples, slots, detectors, or any other system of high-mechanical-performance beamlines, wherein the quick and accurate positioning and/or high stability are needed.

The invention claimed is:

1. An instrument for moving and positioning of optical elements with nanometric mechanical stability and resolution in synchrotron beamlines, comprising:
   a reference structure;
   a mounting structure;

one or more optical elements mounted to the mounting structure;

one or more position actuators configured to move the mounting structure in relation to the reference structure;

at least one reaction mass, attached in a movable manner to the mounting structure, configured to receive a reaction force resulting from the positioning of the mounting structure in relation to the reference structure, through an actuation of the position actuators;

one or more positioning sensors configured to measure a position of the mounting structure in relation to the reference structure;

a main feedback loop including the positioning sensors and the position actuators, configured to use information from the positioning sensors to control the position of the mounting structure through the position actuators, said instrument further comprising:

a complementary mounting structure rigidly mounted to the reference structure such that the positioning sensors are configured to measure the position of the mounting structure in relation to the complementary mounting structure instead of to the reference structure, and the position actuators are configured to move the mounting structure in relation to the complementary mounting structure instead of to the reference structure;

a complementary optical element rigidly mounted to the complementary mounting structure;

a complementary structure attached in a movable manner to the reference structure;

one or more complementary position actuators configured to move the complementary structure in relation to the reference structure;

a first set of elastic components by which the mounting structure is attached in a movable manner to the complementary structure, thereby allowing relative translation or rotation movements along or about one or more axes;

a second set of elastic components by which the reaction mass is attached in a movable manner to the complementary structure, thereby allowing relative translation and rotation movements along or about one or more axes; and a third set of elastic components by which the complementary structure is connected to the reference structure.

2. The instrument according to claim 1, wherein said positioning actuators further comprise a minimum number of Lorentz type actuators equal to a number of free degrees of freedom of the mounting structure, which is the same number of free degrees of freedom of the reaction mass.

3. The instrument according to claim 2, wherein the positioning sensors comprise a minimum number of positioning sensors equal to a number of free degrees of freedom of the mounting structure, which is the same number of free degrees of freedom of the reaction mass.

4. The instrument according to claim 1, wherein each of the first, second and/or third elastic components further comprise one or more of a set of leaf springs or a set of leaf springs.

5. The instrument according to claim 1, wherein the reference structure has a main rotation axis (x), perpendicular to the direction of propagation of the incident beam in the beamline (z).

6. The instrument according to claim 1 wherein the complementary structure is movable in relation to the reference structure only in a translation direction (y') perpendicular to the rotation axis (x) of the reference structure, and has a rotation axis (x') parallel to the rotation of axis (x) of the reference structure, the third set of leaf springs being softer in the translation direction (y'), and stiffer in two directions (x' and z') perpendicular to the translation direction, and in relation to a plurality of rotations directions (Rx, Ry' and Rz').

7. The instrument, according to the claim 6, wherein the mounting structure is movable in relation to the complementary structure in only one translation direction (y), parallel to the translation direction (y') of the complementary structure in relation to the reference structure, and two rotation directions (Rx and Rz'), around a first and a second axis (x and z') perpendicular to the translation direction (y'), the first rotation axis being parallel to the rotation axis (x') of the complementary structure, and the second rotation axis (z') being parallel to the rotation axis (z') of the complementary structure, wherein the third set of leaf springs is softer in the translation direction (y') and in the two rotation directions (Rx' and Rz') and stiffer in the two directions (x', z') perpendicular to the translation direction (y'), as well as in the third rotation direction (Ry').

8. The instrument according to claim 7, wherein the reaction mass is movable in relation to the complementary structure in only one translation direction (y'), parallel to the translation direction of the complementary structure in relation to the reference structure, and two rotation directions (Rx, Rz'), around a first and a second axis (x and z') perpendicular to the translation direction (y'-axis);

the first rotation axis (x') of the reaction mass being parallel to the first rotation axis (x') of the complementary structure;

the second rotation axis (z') of the reaction mass being parallel to the second rotation axis (z') of the complementary structure;

the second set of leaf springs being softer in the direction of the translation (y') and in the two rotation directions and stiffer in the two directions (x', z') perpendicular to (y'), as well as in the third rotation direction (Ry').

9. The instrument according to claim 1, wherein the instrument is a double-crystal monochromator and the optical element and the complementary optical element are diffraction crystals, the first one being rigidly mounted to the mounting structure and the second one being rigidly mounted to the complementary mounting structure.

10. The instrument according to claim 1, wherein the optical element and the complementary optical element comprise multiples pairs of crystals with distinct characteristics, with one element of each pair rigidly mounted to the mounting structure and the other element of each pair rigidly mounted to the complementary mounting structure.

11. The instrument according to claim 1, wherein the positioning sensors comprise interferometric offset sensors with high reading rates and subnanometric resolutions.

* * * * *